(12) United States Patent
Kang et al.

(10) Patent No.: US 7,450,320 B2
(45) Date of Patent: Nov. 11, 2008

(54) ZOOM LENS

(75) Inventors: Yi-Hao Kang, Hsinchu (TW); Chien-Hsiung Tseng, Hsinchu (TW); Yu-Hung Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/830,178

(22) Filed: Jul. 30, 2007

(65) Prior Publication Data

US 2008/0094727 A1 Apr. 24, 2008

(30) Foreign Application Priority Data

Oct. 23, 2006 (TW) .............................. 95138949 A

(51) Int. Cl.
*G02B 15/14* (2006.01)

(52) U.S. Cl. .................................... 359/691

(58) Field of Classification Search ................. 359/686, 359/689, 691, 770, 781–783, 784, 793
See application file for complete search history.

(56) References Cited

U.S. PATENT DOCUMENTS

| 5,541,772 | A | | 7/1996 | Lin |
| 5,710,670 | A | * | 1/1998 | Ohno .......................... 359/691 |
| 6,075,658 | A | | 6/2000 | Nagahara |
| 6,324,014 | B1 | | 11/2001 | Moskovich |

* cited by examiner

*Primary Examiner*—William C Choi
*Assistant Examiner*—Jack Dinh
(74) *Attorney, Agent, or Firm*—J.C. Patents

(57) ABSTRACT

A zoom lens includes a first lens group with a negative refractive power and a second lens group with a positive refractive power, wherein the second lens group is disposed between the first lens group and an image side, and the first lens group and the second lens group are suitable for moving between an object side and the image side. In addition, the first lens group includes a first lens with a negative refractive power, and the first lens is a meniscus lens with a convex surface facing the object side and has an Abbe number greater than 50. A focal length of the zoom lens is F, a focal length of the first lens group is F1, a curvature radius of a surface facing the second lens group of the first lens is R2, and $-0.6 < F/F1 < -0.2$, $0.7 < R2/F < 1.8$.

14 Claims, 5 Drawing Sheets

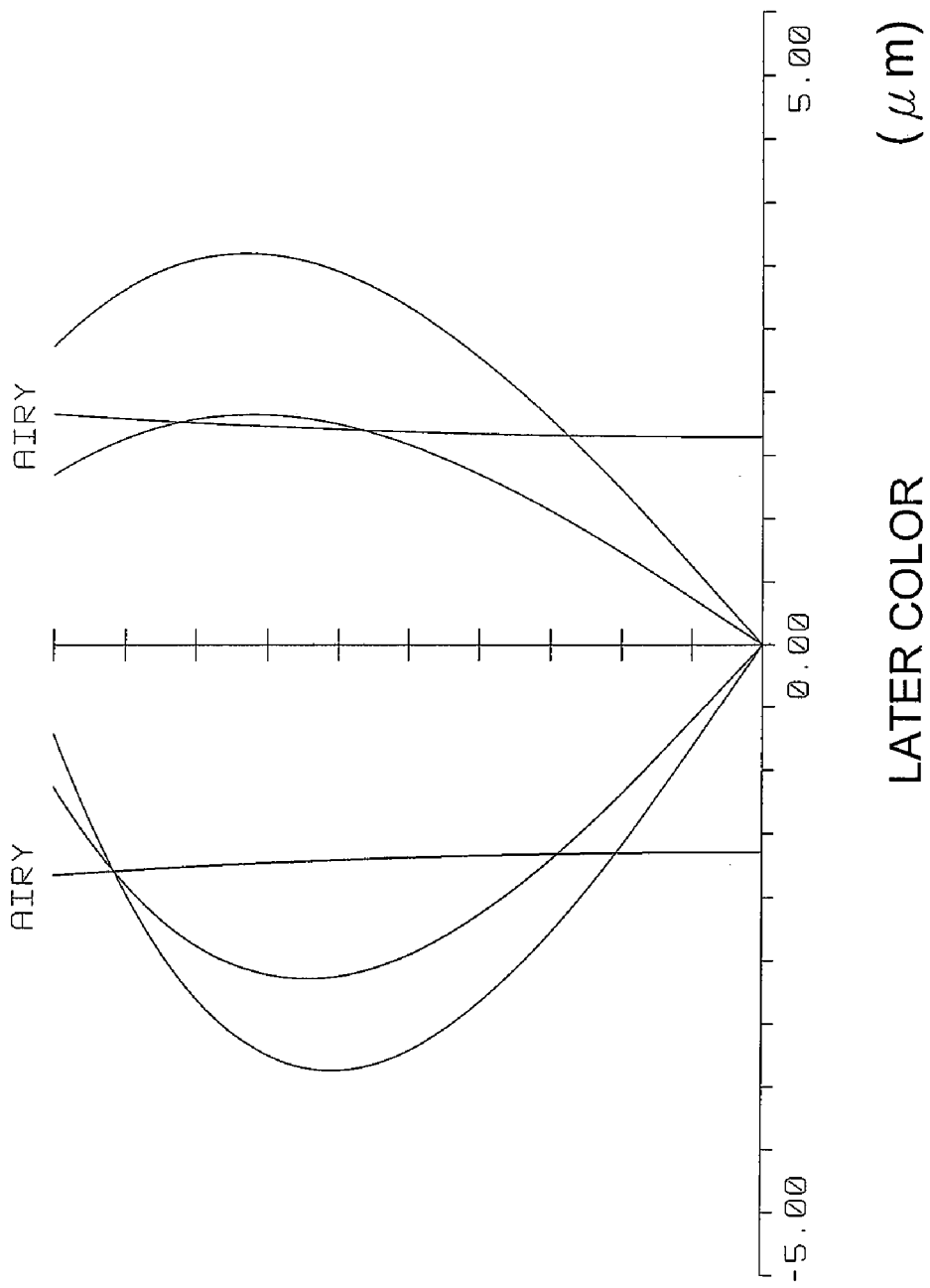

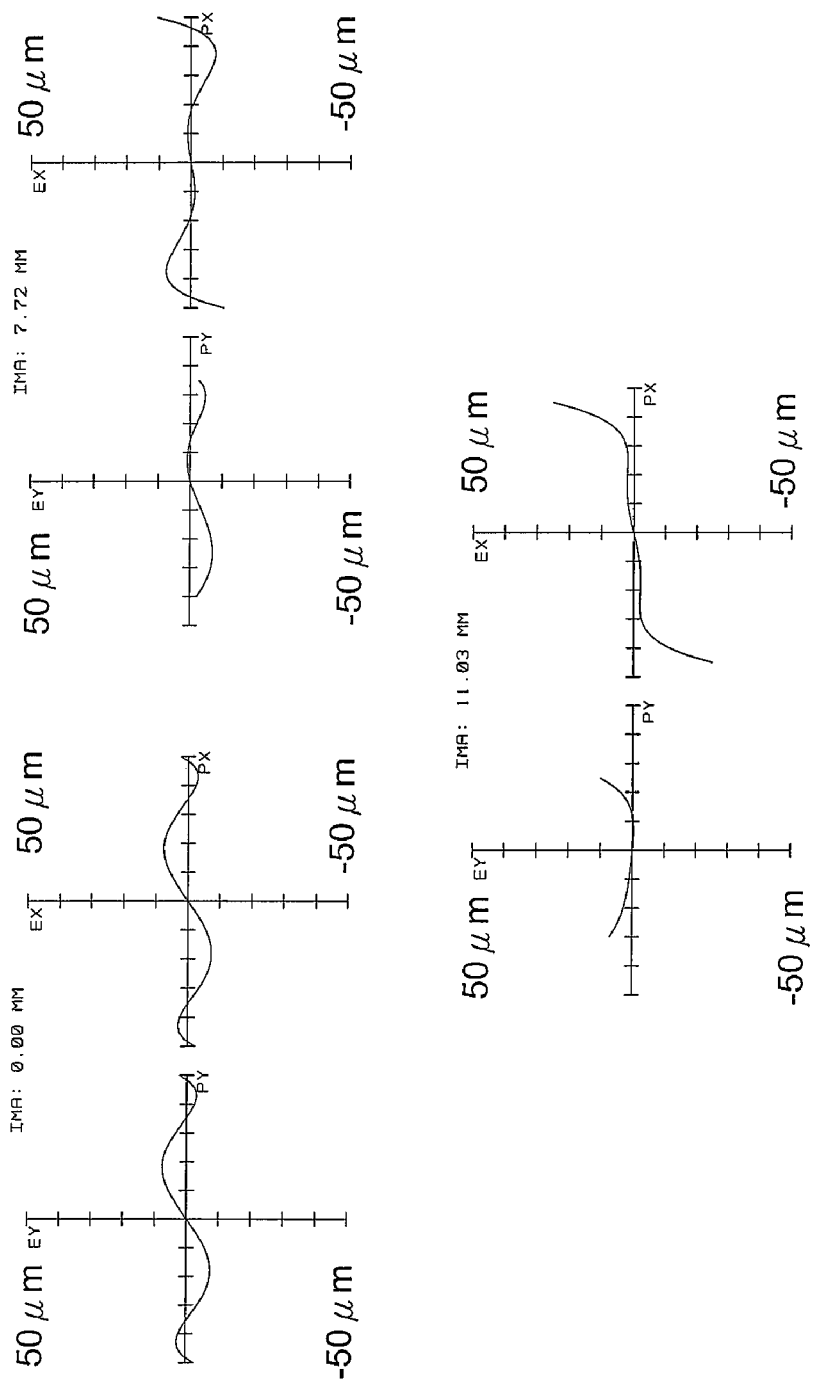
FIG.2D TRANSVERSE RAY FAN PLOT

ZOOM LENS

CROSS-REFERENCE TO RELATED APPLICATION

This application claims the priority benefit of Taiwan application serial no. 95138949, filed on Oct. 23, 2006. All disclosure of the Taiwan application is incorporated herein by reference.

BACKGROUND OF THE INVENTION

1. Field of the Invention

The present invention generally relates to a lens, and more particular, to a zoom lens.

2. Description of Related Art

Usually, a zoom lens is composed of two lens groups, wherein the first lens group near an object side has a negative refractive power for diverging light beams, while the second lens group has a positive refractive power for converging light beams.

However, a conventional zoom lens is composed of two lens groups and having five or six lenses. The conventional zoom lens has an f-number greater than 3.5, so an aperture of the conventional zoom lens is respectively smaller. For example, the conventional zoom lenses disclosed by U.S. Pat. Nos. 6,324,014 and 5,541,772 have the above-mentioned disadvantage and are hard to reach a large relative aperture. In addition, such kinds of conventional zoom lenses employ an aspherical lens for eliminating the aberration, which is more expensive and leads to higher production cost. Furthermore, for the above-mentioned conventional zoom lens to reach a larger relative aperture, more lenses incorporated with the required aspherical lenses are needed to eliminate the aberration, therefore, the production cost of the conventional zoom lens is further increased.

SUMMARY OF THE INVENTION

The present invention is related to a zoom lens for reducing the production cost.

To achieve the above-mentioned or other advantages, the present invention provides a zoom lens, which includes a first lens group having a negative refractive power and a second lens group having a positive refractive power, wherein the second lens group is disposed between the first lens group and an image side. The first lens group and the second lens group are suitable for moving between an object side and the image side. The first lens group includes a first lens having a negative refractive power, and is a meniscus lens with a convex surface thereof facing the object side and an Abbe number greater than 50. In addition, the focal lengths of the zoom lens and the first lens group are respectively F and F1, and a curvature radius of a surface facing the second lens group of the first lens is R2, where $-0.6<F/F1<-0.2$ and $0.7<R2/F<1.8$.

In the present invention, since the first lens group has a single lens, thus, the zoom lens has a simpler structure and is easily fabricated at a lower production cost. In addition, since the Abbe number of the first lens is greater than 50, the aberration of the zoom lens is effectively eliminated. Further, the restriction between $-0.2$ and $-0.6$ of the F/F1 value enables the whole zoom lens to have good zooming effect, in particular, the architecture of the zoom lens becomes more compact.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A-2D are graphic diagrams showing the optical imaging simulation results of a zoom lens taking the wide-end thereof provided by the present invention.

DESCRIPTION OF THE EMBODIMENTS

Figure 1A:
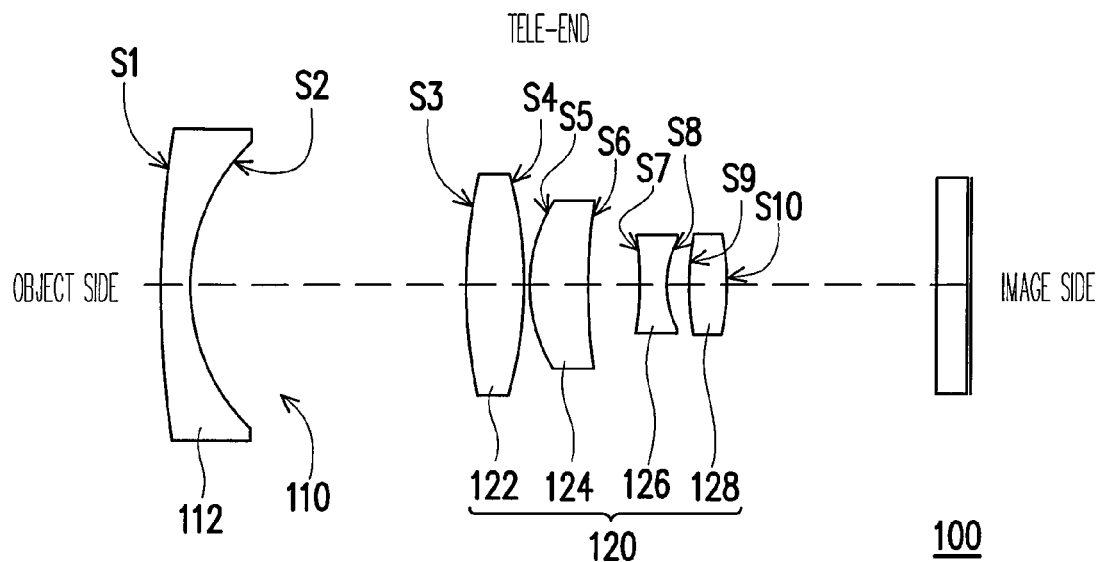
FIGS. 1A and 1B are two diagrams of a zoom lens respectively taking the tele-end and the wide-end according to an embodiment of the present invention.
Figure 1B:
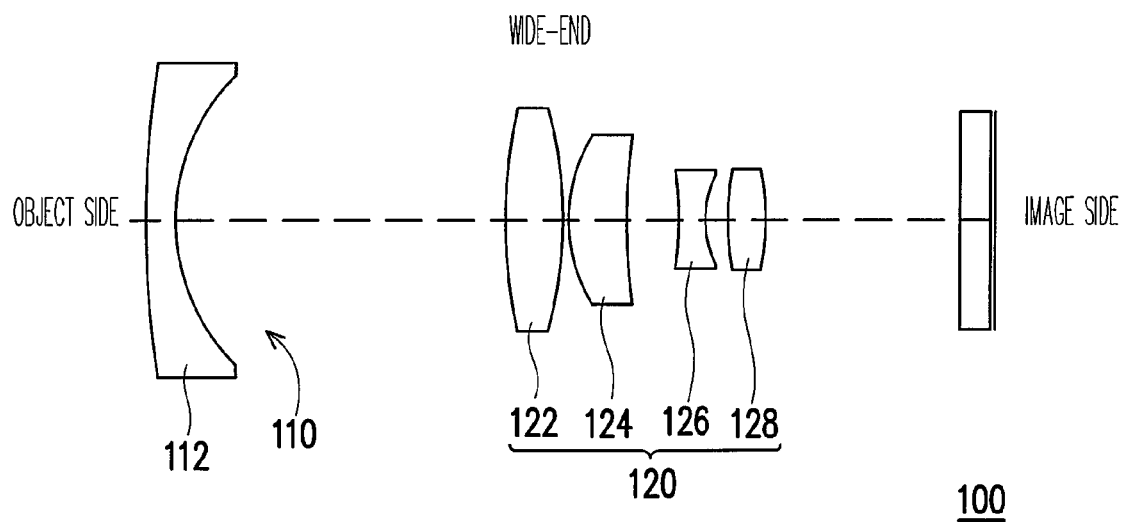

FIGS. 1A and 1B are two diagrams of a zoom lens respectively taking the tele-end and the wide-end according to an embodiment of the present invention. Referring to FIGS. 1A and 1B, the zoom lens 100 of the embodiment includes a first lens group 110 having a negative refractive power and a second lens group 120 having a positive refractive power, wherein the second lens group 120 is disposed between the first lens group 110 and an image side. The first lens group 110 includes a first lens 112 with a negative refractive power, and the first lens 112 is a meniscus lens having a convex surface facing the object side and has an Abbe number greater than 50. In addition, the zoom lens 100 satisfies the following conditions: (1) $-0.6<F/F1<-0.2$; (2) $0.7<R2/F<1.8$, wherein F represents a focal length of the zoom lens 100, F1 represents a focal length of the first lens group 110 and R2 represents a curvature radius of a surface S2 facing the second lens group 120 of the first lens 112.

Since the first lens group 110 has a single lens, thus, the zoom lens 100 has a simpler structure and is easily fabricated at a lower production cost. In addition, since the Abbe number of the first lens 112 is greater than 50, the aberration of the zoom lens 100 is effectively eliminated and has less dependence on the second lens group 120 for eliminating the same. The restriction of the F/F1 value between $-0.2$ and $-0.6$ is helpful to keep the whole zoom lens 100 with a good zooming effect, and, in particular, to make the architecture of the zoom lens 100 become more compact along with good imaging quality.

The first lens group 110 and the second lens group 120 are suitable for moving between an object side and the image side. In more detail, when adjusting the magnification of the zoom lens 100 from the wide-end to the tele-end, the first lens group 110 and the second lens group 120 move towards each other; when adjusting the magnification of the zoom lens 100 from the tele-end to the wide-end, the first lens group 110 and the second lens group 120 move away from each other. Besides, the first lens group 110 has an additional compensation function. That is to say, for the zoom lens 100 used in a projection apparatus, when the projection distance of the projection apparatus is changed (i.e. the distance between the first lens 112 and a screen is changed), the image quality on the screen still keeps sharp by moving the first lens group 110.

In the embodiment, the second lens group 120 includes a plurality of lenses, wherein at least one of the lenses has a negative refractive power and the lens with the negative refractive power has a refractive index greater than 1.7. In more detail, the second lens group 120 includes a second lens 122, a third lens 124, a fourth lens 126 and a fifth lens 128, which are sequentially arranged from the first lens group 110 to the image side and the refractive powers of the second, third, fourth and fifth lenses 122, 124, 126 and 128 are respectively positive, positive, negative and positive. The second lens 122 is a biconvex lens, the third lens 124 is a meniscus lens with a convex surface (surface S5, referring to FIG. 1) facing the object side, the fourth lens 126 is a biconcave lens and the fifth lens is a biconvex lens.

In order to reduce aberration, the material of the second lens 122 is preferably glass with a low dispersion coefficient and an Abbe number of the second lens 122 is between 35 and 75. To reduce spherical aberration, distortion and field curvature, the material of the fourth lens 126 is preferably the glass with a high refractive index (greater than 1.7) and an Abbe number of the fourth lens 126 is between 20 and 50.

In the embodiment, the zoom lens 100 further includes an aperture stop (not shown), which is disposed between the third lens 124 and the fourth lens 126 (for example, between the surfaces S6 and S7), or the aperture stop is disposed on a surface S6 of the third lens 124 near the image side, or the aperture stop is disposed on a surface S7 of the fourth lens 126 near the object side.

Remarkably, the zoom lens 100 of the embodiment doesn't employ expensive aspherical lenses for eliminating aberrations. In fact, all the lenses used in the first lens group 110 and the second lens group 120 are low cost spherical lenses, and therefore, the production cost of the zoom lens 100 is significantly lowered.

In the following, a preferred embodiment of the zoom lens 100 is explained, wherein the cited data does not intend to limit the present invention and anyone skilled in the art is allowed to modify the data to fit the practical application which still belongs to the scope of the present invention.

TABLE 1

| surface | curvature radius (mm) | interval (mm) | refractive index | Abbe number | remark |
|---|---|---|---|---|---|
| S1 | 148.13 | 2.04 | 1.61 | 58.72 | the first lens |
| S2 | 23.53 | variable interval (T1) | | | |
| S3 | 56.23 | 6 | 1.49 | 70.24 | the second lens |
| S4 | −42.29 | 1.13 | | | |
| S5 | 18.15 | 5.85 | 1.77 | 49.6 | the third lens |
| S6 | 54.75 | 5.20 | | | |
| S7 | −41.62 | 3.21 | 1.81 | 25.425 | the fourth lens |
| S8 | 15.00 | 1.98 | | | |
| S9 | 40.41 | 3.90 | 1.74 | 49.34 | the fifth lens |
| S10 | −21.14 | variable interval (T2) | | | |

In table 1, curvature radius is referred as the curvature radius of each surface. Interval is referred as the distance along the optical axis between two adjacent surfaces. For example, the interval corresponding to the row of the surface S1 means the distance between the surfaces S1 and S2. For the lenses given in the remark cells, the thickness, the refractive index and the Abbe number thereof respectively correspond to the interval, the refractive index and the Abbe number of the same row. Besides, in table 1, the surfaces S1 and S2 respectively represent the two surfaces of the first lens 112 departing from and near the second lens 122. The surfaces S3 and S4 respectively represent the two surfaces of the second lens 122 departing from and near the third lens 124. The surfaces S5 and S6 respectively represent the two surfaces of the third lens 124 departing from and near the fourth lens 126. The surfaces S7 and S8 respectively represent the two surfaces of the fourth lens 126 departing from and near the fifth lens 128. The surfaces S9 and S10 respectively represent the two surfaces of the fifth lens 128 near and departing from the fourth lens 126.

Some important parameters of the zoom lens 100 corresponding to the wide-end case and the tele-end case are listed in table 2, which include effective focal length (EFL), field of view (FOV) and variable intervals T1 and T2. In the embodiment, the aperture stop is disposed on the surface S7, F/F1=−0.47, R2/F=1.08, the Abbe number of the first lens is 58.72 and the refractive index of the fourth lens 126 is 1.81. Compared to the prior art, since the f-number of the zoom lens 100 in the embodiment is smaller than 3.5, or a smaller value of 2.45, thus, the zoom lens 100 has a larger aperture and a larger relative aperture. Furthermore, the zoom lens 100 of the embodiment merely employs five spherical lenses to reach a smaller f-number than the zoom lens (with an f-number greater than 3.5) of the prior art where more lenses including aspherical lenses are employed for eliminating aberration, therefore, the present invention has the advantage of reducing the production cost and simplifying the lens structures.

TABLE 2

| | | wide-end | tele-end |
|---|---|---|---|
| effective focal length (EFL) | | 21.8 | 24 |
| field of view (FOV) | | 54.9 | 49.8 |
| f-number | | 2.45 | 2.57 |
| variable interval | T1 | 33.79 | 28.79 |
| (mm) | T2 | 19.72 | 21.06 |

Figure 2A:
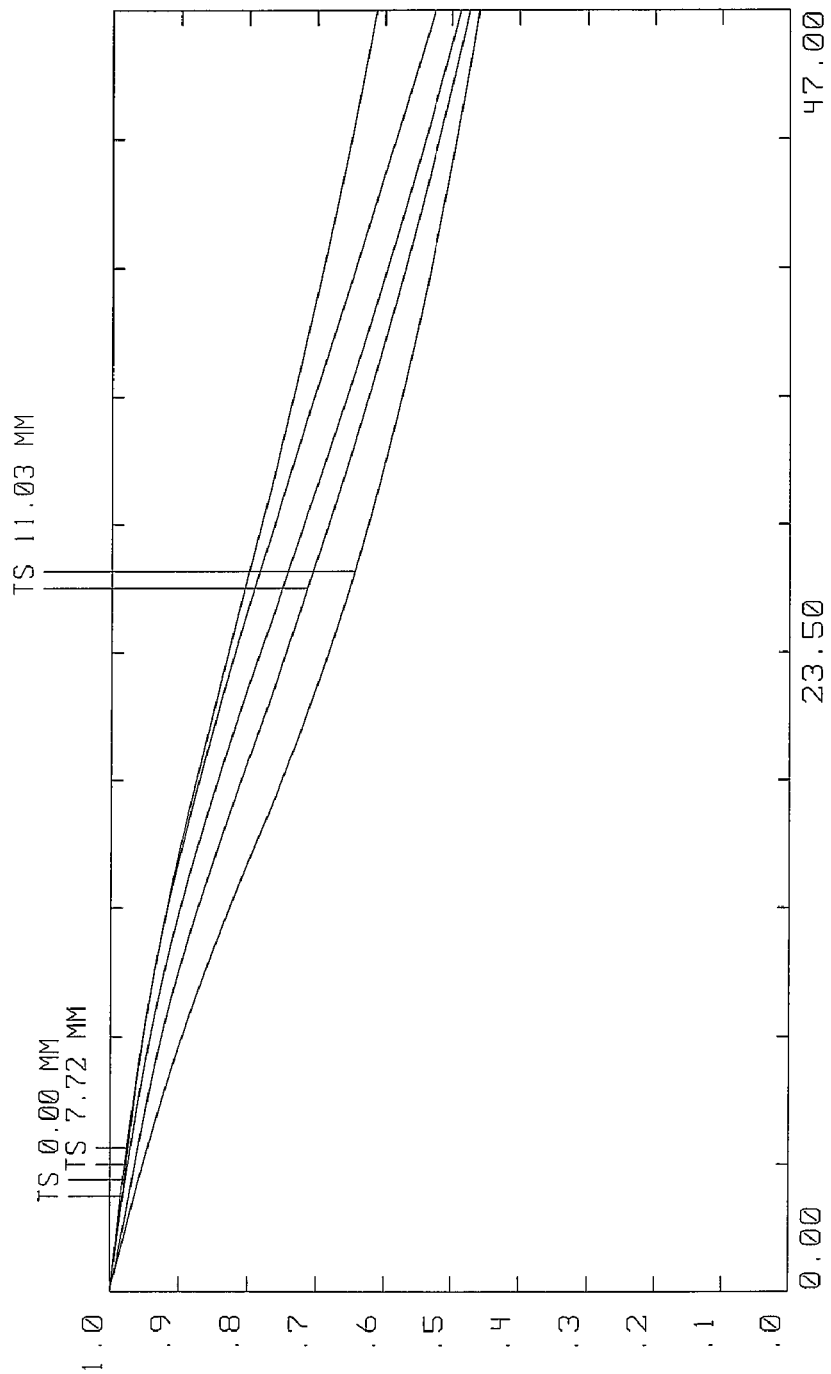
Figure 2B:
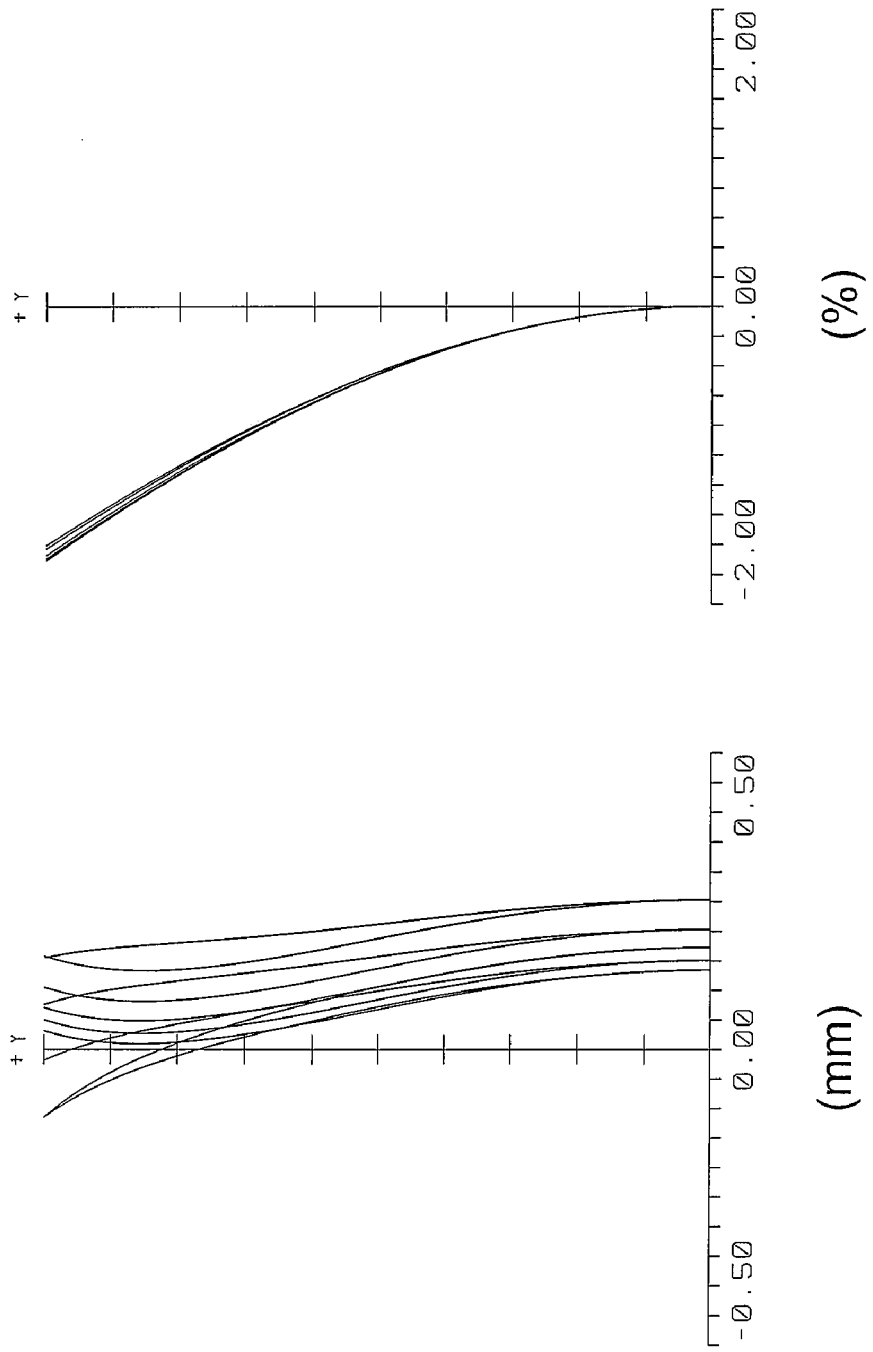

FIGS. 2A-2D are graphic diagrams showing the optical imaging simulation results of a zoom lens taking the wide-end thereof provided by the present invention, wherein FIG. 2A is a graphic diagram showing the modulation transfer function (MTF) with the abscissa representing spatial frequency in cycles per millimeter (mm) and the ordinate representing modulus of the OTF. FIG. 2B is a graphic diagram showing the field curvature and the distortion. FIG. 2C is a graphic diagram showing the later color. FIG. 2D is a transverse ray fan plot. As shown in FIGS. 2A-2D, the simulated results of the MTF, the field curvature and the distortion, the later color and the transverse ray fan plot are within the permitted range specified by the standard, which indicates the zoom lens 100 of the present invention has good imaging quality.

In summary, the zoom lens of the present invention has at least one or more of the following advantages:

1. The first lens merely has a lens, hence, the structure of the zoom lens is more simple and easy to be fabricated at a lower production cost.

2. Since the Abbe number of the first lens is greater than 50, the aberration is effectively eliminated.

3. F/F1 ranges between −0.2 and −0.6, which enables the architecture of the zoom lens more compact along with good imaging quality.

4. The material of the second lens is glass with a low dispersion coefficient, while the material of the fourth lens is glass with a refractive index greater than 1.7 and an Abbe number between 20 and 50, which is helpful to eliminate the aberration.

5. All the lenses employed by the zoom lens of the present invention are low cost spherical lenses, which is capable of reducing the production cost.

6. The zoom lens of the present invention has a smaller f-number, hence, the relative aperture is accordingly larger.

The zoom lens provided by an embodiment of the present invention employs merely five lenses to reach a smaller f-number than the conventional zoom lens (always with an f-number greater than 3.5 for a conventional zoom lens), therefore, the production cost is reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
a first lens group, having a negative refractive power and comprising a first lens with a negative refractive power, wherein the first lens is a meniscus lens with a convex surface facing an object side and an Abbe number greater than 50; and
a second lens group, having a positive refractive power, disposed between the first lens group and an image side, wherein the first lens group and the second lens group are suitable for moving between the object side and the image side,
wherein a focal length of the zoom lens is F, a focal length of the first lens group is F1, a curvature radius of a surface facing the second lens group of the first lens is R2, and −0.6<F/F1<−0.2, 0.7<R2/F<1.8.

2. The zoom lens according to claim 1, wherein the second lens group comprises a plurality of lenses, at least one of the lenses has a negative refractive power and the lens with the negative refractive power has a refractive index greater than 1.7.

3. The zoom lens according to claim 2, wherein the second lens group comprises a second lens, a third lens, a fourth lens and a fifth lens, wherein the second, third, fourth and fifth lenses are sequentially arranged from the first lens group to the image side and refractive powers thereof are respectively positive, positive, negative and positive.

4. The zoom lens according to claim 3, wherein the second lens is a biconvex lens, the third lens is a meniscus lens with a convex surface facing the object side, the fourth lens is a biconcave lens and the fifth lens is a biconvex lens.

5. The zoom lens according to claim 3, wherein an Abbe number of the second lens is between 35 and 75.

6. The zoom lens according to claim 3, wherein an Abbe number of the fourth lens is between 20 and 50.

7. The zoom lens according to claim 3, further comprising an aperture stop disposed between the third lens and the fourth lens, or the aperture stop disposed on a surface of the third lens near the image side, or the aperture stop disposed on a surface of the fourth lens near the object side.

8. The zoom lens according to claim 1, wherein all the lenses of the first lens group and the second lens group are spherical lenses.

9. The zoom lens according to claim 1, wherein the first lens group is composed of the first lens, while the second lens group is composed of a second lens, a third lens, a fourth lens and a fifth lens, wherein the second, third, fourth and fifth lenses are sequentially arranged from the first lens group to the image side and refractive powers thereof are respectively positive, positive, negative and positive.

10. The zoom lens according to claim 9, wherein the second lens is a biconvex lens, the third lens is a meniscus lens with a convex surface facing the object side, the fourth lens is a biconcave lens and the fifth lens is a biconvex lens.

11. The zoom lens according to claim 9, wherein an Abbe number of the second lens is between 35 and 75.

12. The zoom lens according to claim 9, wherein an Abbe number of the fourth lens is between 20 and 50.

13. The zoom lens according to claim 9, further comprising an aperture stop disposed between the third lens and the fourth lens, or on a surface of the third lens near the image side, or on a surface of the fourth lens near the object side.

14. The zoom lens according to claim 9, wherein an f-number of the zoom lens is smaller than 3.5.

* * * * *